(No Model.) 6 Sheets—Sheet 1.

G. WESTINGHOUSE, Jr.
FLUID PRESSURE AUTOMATIC BRAKE.

No. 573,190. Patented Dec. 15, 1896.

WITNESSES:
T. J. Hogan
F. E. Gaither

INVENTOR,
Geo. Westinghouse Jr.
by J. Snowden Bell,
Att'y.

THE NORRIS PETERS CO., PHOTO-LITHO., WASHINGTON, D. C.

(No Model.) G. WESTINGHOUSE, Jr.  
FLUID PRESSURE AUTOMATIC BRAKE.

No. 573,190. Patented Dec. 15, 1896.

(No Model.) 6 Sheets—Sheet 3.
G. WESTINGHOUSE, Jr.
FLUID PRESSURE AUTOMATIC BRAKE.
No. 573,190. Patented Dec. 15, 1896.
FIG. 6.
FIG. 5.
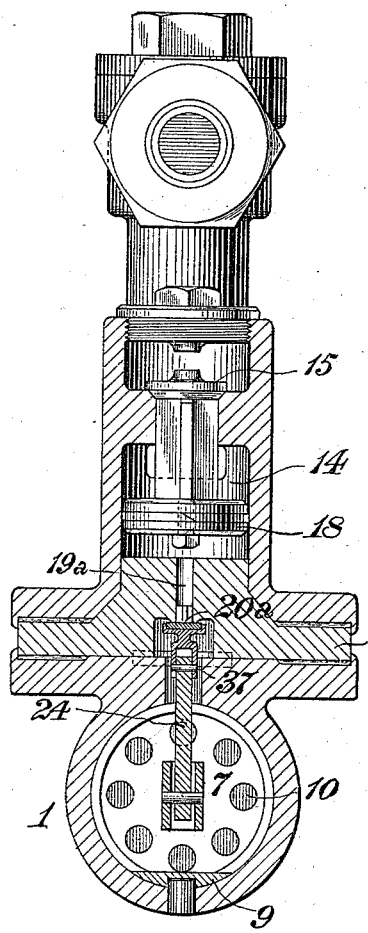
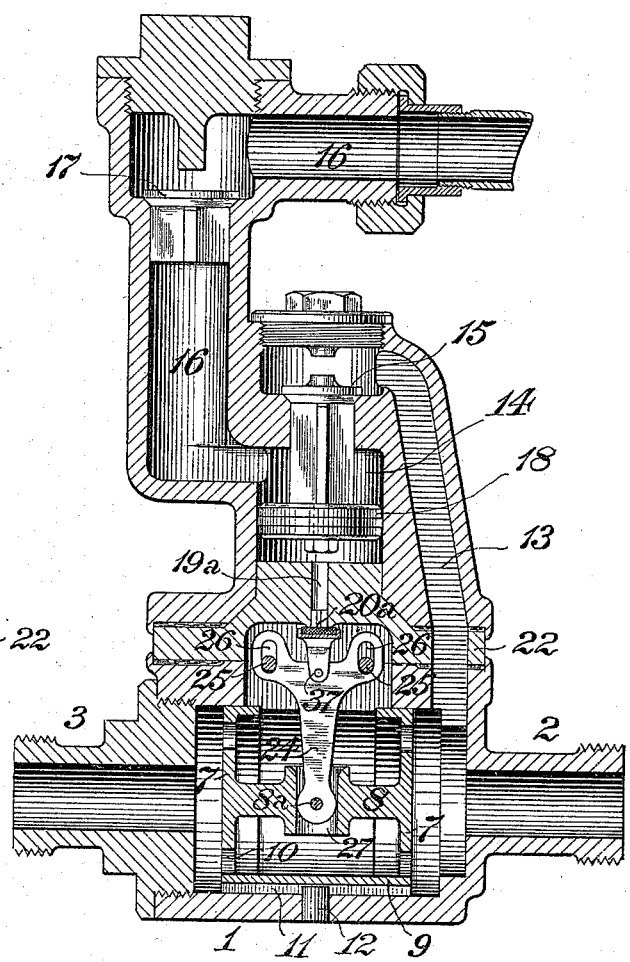
WITNESSES:
INVENTOR, (No Model.)
6 Sheets—Sheet 4.
G. WESTINGHOUSE, Jr.
FLUID PRESSURE AUTOMATIC BRAKE.
No. 573,190.
Patented Dec. 15, 1896.
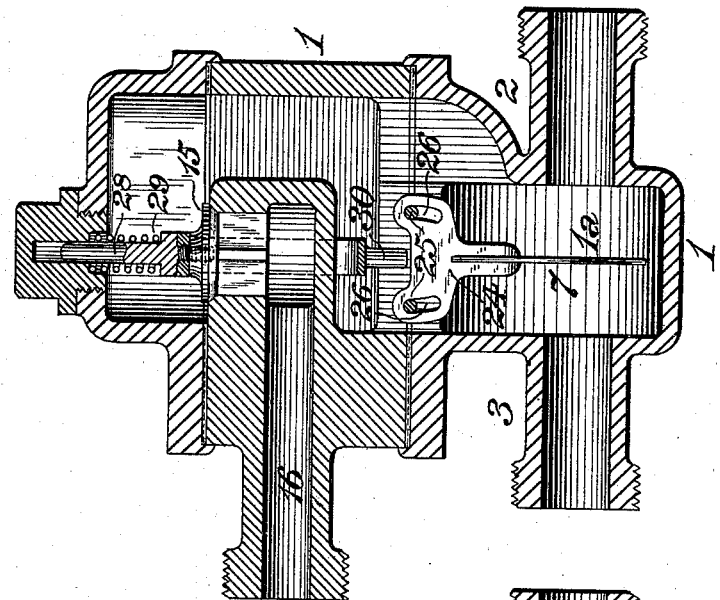
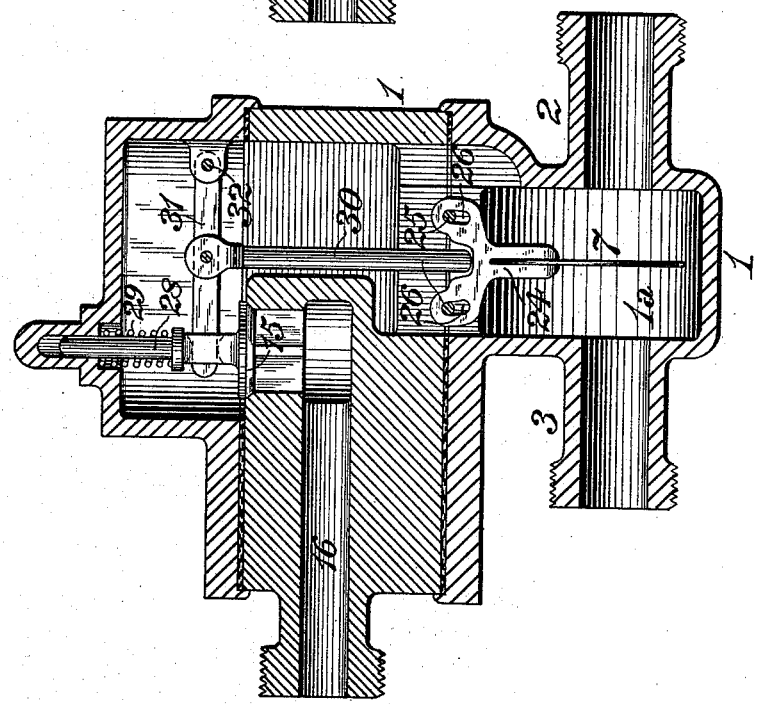
WITNESSES:
INVENTOR, (No Model.) 6 Sheets—Sheet 5.
G. WESTINGHOUSE, Jr.
FLUID PRESSURE AUTOMATIC BRAKE.
No. 573,190. Patented Dec. 15, 1896.
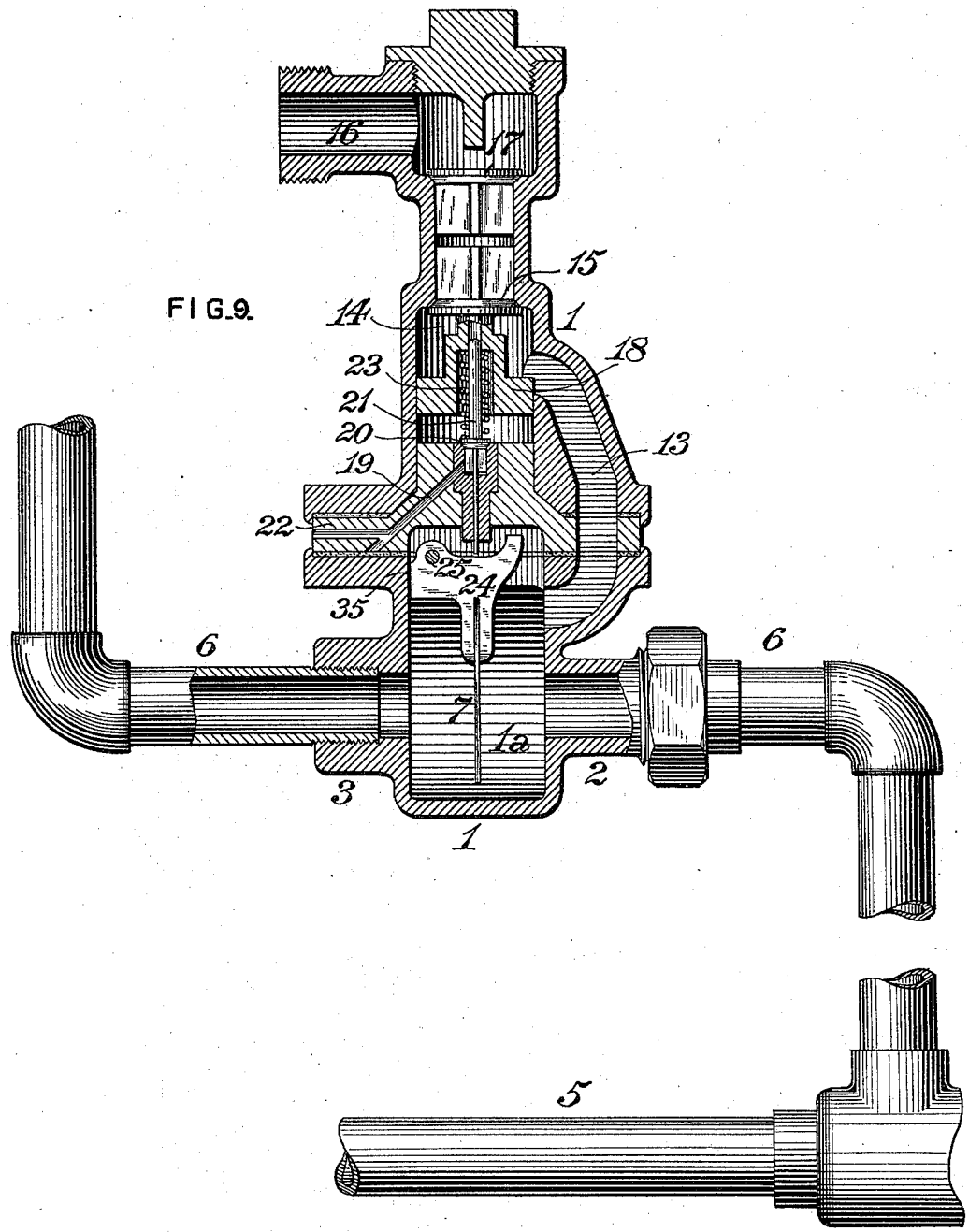
WITNESSES:
INVENTOR, (No Model.)  6 Sheets—Sheet 6.
G. WESTINGHOUSE, Jr.
FLUID PRESSURE AUTOMATIC BRAKE.
No. 573,190. Patented Dec. 15, 1896.
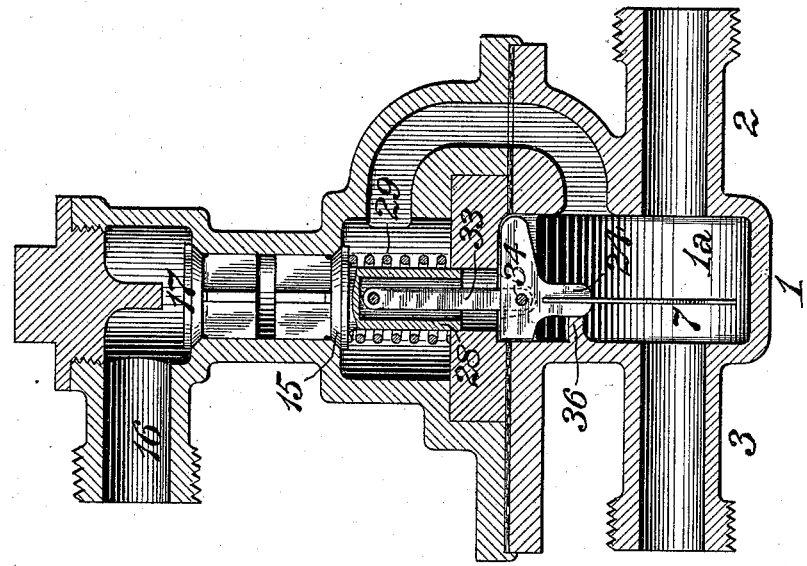
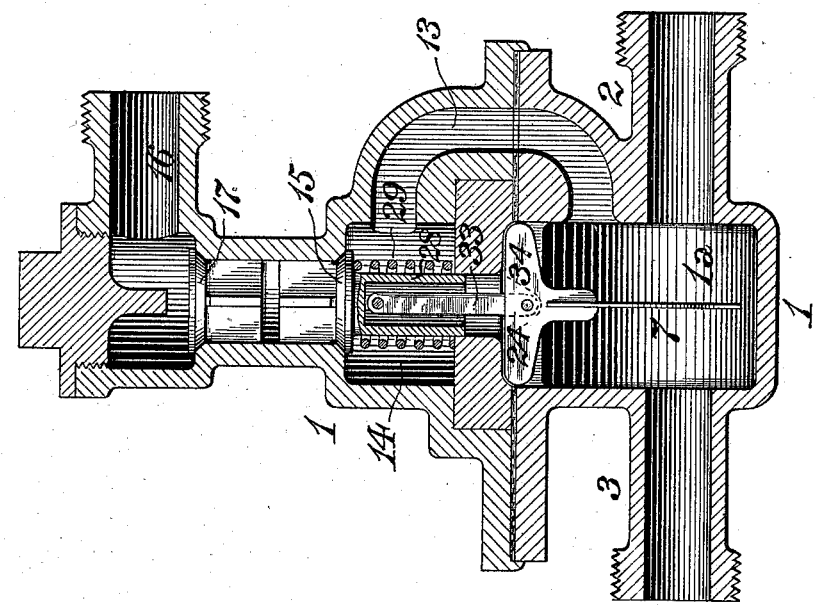
WITNESSES:
INVENTOR,
Geo. Westinghouse Jr
by Howden Bell,
Att'y.

UNITED STATES PATENT OFFICE.

GEORGE WESTINGHOUSE, JR., OF PITTSBURG, PENNSYLVANIA, ASSIGNOR TO THE WESTINGHOUSE AIR BRAKE COMPANY, OF SAME PLACE.

FLUID-PRESSURE AUTOMATIC BRAKE.

SPECIFICATION forming part of Letters Patent No. 573,190, dated December 15, 1896.

Application filed September 3, 1895. Serial No. 561,283. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered a certain new and useful Improvement in Fluid-Pressure Automatic Brakes, of which improvement the following is a specification.

My invention relates to devices employed in fluid-pressure automatic brake apparatus, and commonly known under the general designation of "quick-action valves," which are designed to increase the rapidity and effectiveness of the application of the brakes whenever desired without interfering with their ordinary operation in cases where such increase may not be considered necessary.

The object of my present invention is to provide an appliance of such character which shall be of simple and inexpensive construction, effective in operation, and independent both structurally and as to operative capability of connection with or control by the triple valves of the brake system in which it is employed.

To this end my invention, generally stated, consists in the combination of a valve controlling the release of air from the train-pipe of an automatic brake apparatus, a movable member fitted in the line of traverse of fluid-pressure between a train-pipe and a triple-valve device, and limiting such traverse past or through it, and mechanism actuated by said movable member for effecting opening movement of the release-valve.

The improvement claimed is hereinafter fully set forth.

Figure 2:
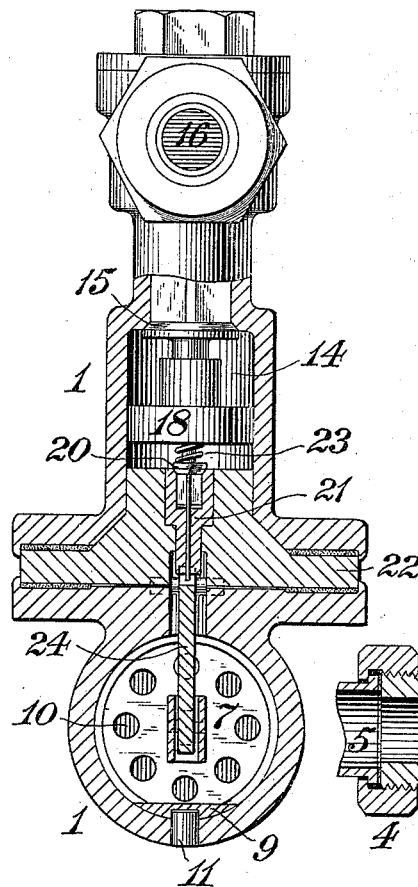
Figure 1:
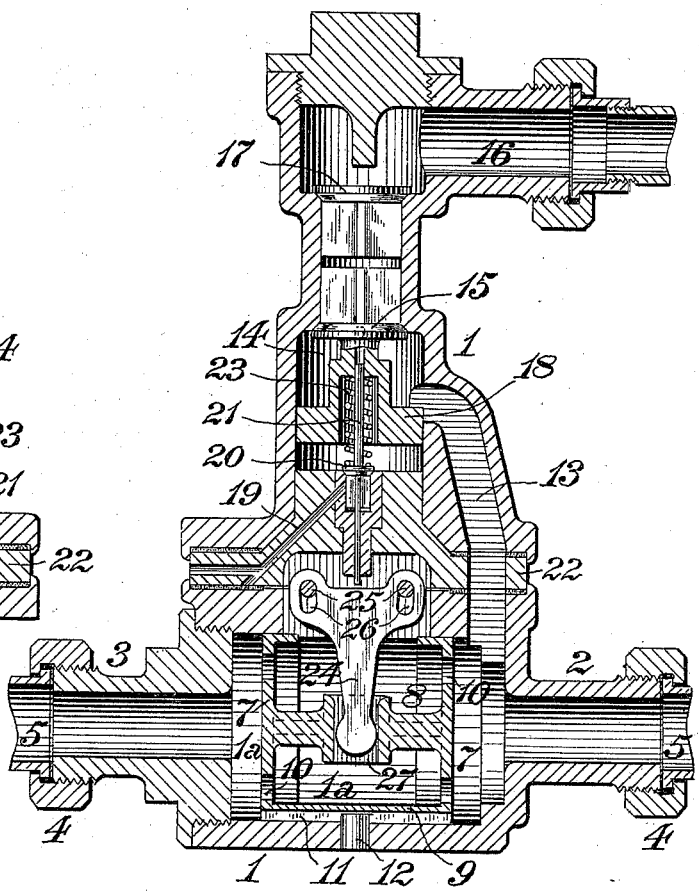
Figure 4:
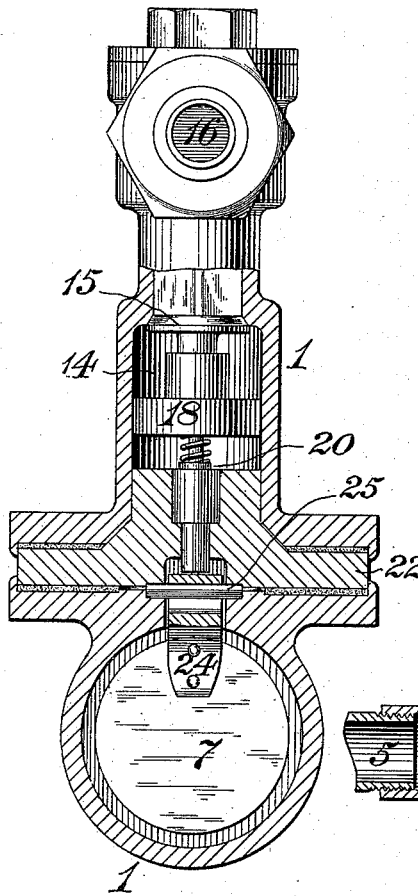
Figure 3:
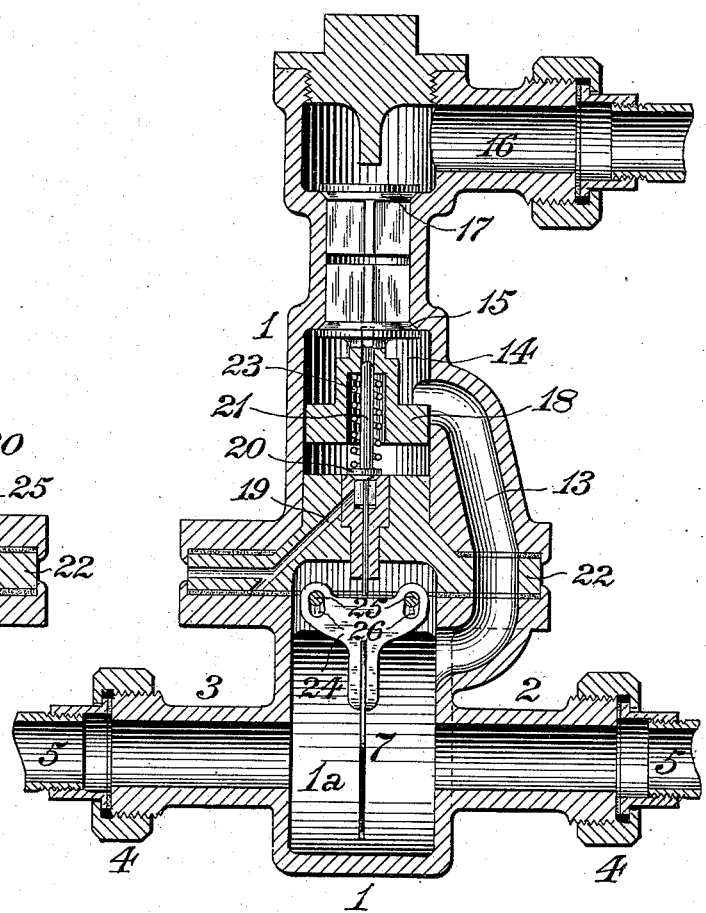

In the accompanying drawings, Figure 1 is a vertical longitudinal central section through a valvular mechanism, illustrating an application of my invention; Fig. 2, a vertical transverse central section through the same; Figs. 3 and 4, respectively, similar sections showing a modified form of the movable partition; Figs. 5 and 6, respectively, similar sections showing a modification of the means for effecting variation of pressure on opposite sides of the piston of the preceding figures; Figs. 7 and 8, vertical longitudinal central sections through mechanisms illustrating, respectively, modifications in the details of the mechanism for imparting movement from the partition to the release-valve; Figs. 9 and 10, vertical longitudinal central sections through mechanisms adapted to be fitted in the branch pipe leading from the train-pipe to the triple valve; and Fig. 11, a similar section through a mechanism similar to that of Fig. 10, except in the particular of being adapted to be fitted in the train-pipe.

In the practice of my invention, as exemplified in Figs. 1 and 2, I provide a casing or chest, the lower portion of which incloses a chamber $1^a$, having on its opposite sides tubular connections or nozzles 2 3, which are externally threaded to receive unions 4 4, or otherwise suitably adapted to be connected to sections of the train-pipe 5 of an automatic air-brake apparatus which, as in the ordinary practice and as shown in Fig. 9, is provided with a branch pipe 6, leading to a triple-valve device of any suitable and preferred construction. The casing 1 may be placed in the train-pipe on either side of the branch pipe, and one of its connections, as, say, 2, will thus be in communication with the train-pipe between the branch pipe and the engineer's brake-valve and the other, as, say, 3, with the triple-valve device through the branch pipe leading thereto.

A partition 7, which in this instance is formed of two light plates or heads connected by a central stem 8 and by a lower guide-piece 9, is fitted to slide freely in the chamber $1^a$ of the casing 1 and at all times to limit communication between the connections 2 3 to such degree as is permitted by always-open ports, which are shown as openings 10, formed in the heads of the partition. The form and location of said always-open ports are not, however, material, so long as they permit at all times the traverse of air through a passage of limited transverse area relatively to that of the train-pipe, such, for example, as would be afforded by grooves in the casing or longitudinal passages open thereto on opposite sides of the partition. Movement of the partition 7 about its axis is in the instance shown prevented by a pin 11, fixed in the casing and fitting freely in a longitudinal slot 12 in the guide-piece 9.

A lateral passage 13 in the casing 1 leads from one of its tubular connections, as, say, 2, to a chamber 14 in the casing above the casing $1^a$, in which the partition 7 is fitted, and the outer end of said chamber 14 is closed by a train-pipe release-valve 15, which opens inwardly and controls the local release or venting of air from the train-pipe 5 through a discharge-pipe 16. The pipe 16 is preferably led into the brake-cylinder, in order, as in the most approved practice, to utilize the air vented from the train-pipe in increasing the force with which the brakes are applied, but it may, if desired, discharge directly into the atmosphere. An outwardly-opening check-valve 17 may, as shown, be fitted to a seat in the discharge-pipe 16, or, if preferred, it may be dispensed with, as in the constructions shown in Figs. 7 and 8.

The release-valve 15 is in this instance formed upon or secured to the upper end of a piston 18, fitting in the chamber 14 and normally subject to pressure which is equal in degree on its upper and its lower sides, but which, being exerted upon a greater area on the lower side, tends to maintain the release-valve normally seated. The air from the train-pipe passes into the chamber 14 above the piston through the passage 13 and leaks past the piston until the pressure equalizes on the upper and lower sides thereof. An exhaust port or passage 19 leads from the chamber 14 below the piston 18 to the atmosphere and is controlled by an exhaust-valve 20, fixed upon a stem 21, which extends through a plate 22, interposed between the chamber 14 and the lower chamber $1^a$, in which the partition 7 is fitted. The exhaust-valve 20 is normally held seated by a spring 23, interposed between the exhaust-valve and the piston 18, and which also tends to return and hold the train-pipe release-valve 15 to its seat.

A rocker 24 is hung upon pins 25, fixed transversely in the upper portion of the chamber $1^a$, in which the partition 7 is fitted, the pins 25 fitting in curved slots 26 at opposite sides of the rocker, the axes of the pins being, preferably, at right angles to the axial line of the partition 7, and the central plane of the guide-slot 12 and the curvature of each of the slots 26 being struck from the center of the pin 25 of the opposite slot. The top of the rocker 24, when the same is in its central and normal position, stands close to, but clear of, the lower end of the stem 21 of the exhaust-valve 20, and opposite curved bearing-faces formed on the rocker at its lower end fit against the ends of a longitudinal slot 27 in the central stem 8 of the partition 7. Under this construction it will be seen that longitudinal movement of the partition 7 in either direction will swing the rocker 24 upon one or the other of the supporting-pins 25, and thereby raise it at its top, so that it will bear against the stem 21 of the exhaust-valve 20 and thereby unseat said valve.

The construction shown in Figs. 3 and 4 is identical in all particulars with that of Figs. 1 and 2, except that the partition 7 is in the form of a single plate or disk fixed to the rocker 24 and of smaller diameter than the chamber $1^a$, so that an annular space is left around it for the passage of air through the chamber $1^a$ from one of the connections 2 3 to the other, as a mechanical equivalent for the openings 10 in the partition 7 of Figs. 1 and 2.

In the operation of the appliance in connection with an automatic air-brake system, (the train-pipe 5 being assumed to be charged with air at the usual working-pressure, as, say, seventy pounds to the square inch,) when the ordinary comparatively slight reduction of pressure in the train-pipe is made by the engineer to effect a "service" application of the brakes, such as in making stops at stations or reducing the speed of the train in passing over portions of the road at slower than normal speed, air passes from the rear to the front of the train-pipe through the openings 10 in the partitions 7 of the several casings 1 without effecting movement of either of said partitions, and the release-valves 15 consequently remain seated. The action of the triple-valve devices in making service applications is therefore unaffected by the connection of my present invention with the other members of the brake apparatus. When, however, a rapid and considerable reduction of train-pipe pressure is made, either by the engineer for the purpose of applying the brakes with maximum rapidity and force, as in cases of emergency, or by reason of a rupture of the train-pipe or the parting of the connection between any two vehicles of the train, the rapidity and volume of the air which passes along the train-pipe to its point of escape therefrom are too great to admit of its unobstructed passage through the area afforded by the openings in the partitions 7 or the annular spaces around the same, and the partitions 7 are consequently moved in the direction of the traverse of the escaping air, thereby swinging the connected rockers 24 upon one or the other of their supporting-pins 25, and, through the bearing of the rockers, when raised, upon the stems 21 of the exhaust-valves 20, unseating said valves and releasing the pressure below the pistons 18 to the atmosphere through the ports or passages 19. The excess of pressure which is then and thereby imposed upon the upper sides of the pistons 18 thereupon moves said pistons downwardly, unseating the connected release-valves 15, and the air from the train-pipe raises the check-valves 17 and is vented, through the discharge-pipes 16, to the brake-cylinder or to the atmosphere, accordingly as said pipes may be led to one or to the other. The local venting of the train-pipe adjacent to each of the triple-valve devices which is thus effected greatly expedites the serial application of the brakes throughout the train, and when the discharge-pipe 16 is led into the brake-cylinder also substantially increases the force with which the brakes are applied, as has been fully demonstrated in the operation of quick-action brake apparatus of the present Westinghouse standard type.

Figs. 5 and 6 illustrate a modification in which variation of the relative degree of pressure on opposite sides of the piston 18 is effected to cause the movement of said piston in direction to unseat the release-valve 15 by the admission of pressure on one side of said piston, instead of its exhaust therefrom, as in the previous instances. The piston 18 is in this case also normally subject to the same degree of pressure, to wit, atmospheric pressure, on its upper and lower sides, and the release-valve 15, which controls an opening from the lateral passage 13 to the discharge-pipe 16, is normally held seated by train-pipe pressure acting on its upper side. A port or passage $19^a$ leads from the piston-chamber 14 on the lower side of the piston into the chamber $1^a$ of the partition 7 and is controlled by an inlet-valve $20^a$, which is coupled by a pin 37 to the rocker 24, the lower end of which is coupled by a pin $8^a$ to the central stem 8 of the partition 7. The pins 25 act, as before, as fulcrums for the rocker 24 in its movements, but do not suspend it, and are located at the bottoms of the slots 26, so that the middle portion of the top of the rocker will be moved downwardly and unseat the connected inlet-valve $20^a$ in and by the movement of the partition 7 in either direction. The train-pipe air admitted to the lower side of the piston 18 by the unseating of the valve $20^a$ raises the piston and connected release-valve 15, thereby locally venting the train-pipe through the discharge-pipe 16, as and with the result before described.

In the modified form of my invention, which is shown in Figs. 7, 8, 10, and 11, the action of the movable partition 7 and rocker 24 is exerted directly upon the train-pipe release-valve 15, instead of being employed to actuate an intermediate exhaust-valve 20 or inlet-valve $20^a$, and thereby impart opening movement to a piston 18, connected to the release-valve, as in instances previously described. In Figs. 7, 8, 10, and 11 the release-valve 15 is fixed upon a stem 28, and is seated by a spring 29, which acts, in conjunction with train-pipe pressure, to hold it normally seated.

As shown in Fig. 7, the actuating mechanism interposed between the rocker 24 and the release-valve 15 consists of a stem 30, which is pivoted at its upper end to a lever-arm 31, one end of which is pivoted to the wall of the casing 1 and the other or free end fits in a slot in the stem of the release-valve. When the rocker 24 is swung on either of its supporting-pins 25 by a rapid and material reduction of train-pipe pressure, as before described, the stem 30 is raised, and, acting through the lever-arm 31 on the stem 28 of the release-valve 15, unseats said valve and locally vents train-pipe pressure through the discharge-pipe 16.

Fig. 8 illustrates a further modification in which the stem 30 acts directly upon the stem of the release-valve, instead of through an interposed lever-arm, as in the instance last described. The stem 30 is, in this case, longitudinally slotted, so as to pass on each side of the inward projection of the casing in which the seat of the valve 15 is formed, and is secured at its upper end to the stem 28 of said valve, which is, as before, unseated by the movement of the rocker 24 and connected partition 7, on either of the pins 25, and the consequent elevation of the connected stems 30 and 28.

In the modification shown in Figs. 10 and 11 the supporting-pins 25 are dispensed with and the rocker 24 and partition 7 are connected to and supported by a link 33, which is pivoted at its lower end by a pin 34 to the rocker 24 in the central plane of the partition 7, and is pivoted at its upper end to the stem 28 of the release-valve 15. The release-valve is, as in Figs. 7 and 8, unseated by the movement of the rocker and partition through intermediate connections by which such movement is transmitted to it. The rocker 24 in its movements bears directly on the wall of the casing 1, instead of, as in the previous instances, upon a separate supporting-pin fixed thereto, and is held to its bearing by its connection with the release-valve 15.

Figs. 9 and 10 show modifications in which the appliance is adapted to be fitted in the branch pipe 6, leading to the triple-valve device, instead of in the train-pipe proper, and in which, therefore, the partition 7 is required to move in one direction only from normal position to effect opening movement of the release-valve, and is held as against movement from normal position in the opposite direction, so as to prevent the accidental and undesired opening of the release-valve in charging the train-pipe to put the brake mechanism in running condition. When the device is placed in the branch pipe, the passage around the partition must be made correspondingly smaller, on account of the lesser volume of air available for its operation.

The construction of Fig. 9 is identical with that of Figs. 3 and 4, except in the particular that the rocker 24 is hung upon one pin 25 only, said pin being located on the side of the central plane of the partition 7 which is nearest the triple-valve device and fitting a corresponding hole in the rocker instead of a curved slot therein. A stop or bearing face 35 is formed on the end of the rocker 24 nearest the triple-valve device, said bearing-face fitting against the wall of the casing when the rocker and partition are in normal position and preventing movement of the same from said position in the direction of the triple-valve device.

The construction of Fig. 10 is identical with that of Fig. 11, (before described,) except in a particular corresponding with that of the difference between Fig. 9 and Figs. 3 and 4, that is to say, the rocker 24 is cut away at the end nearest the triple-valve device and a stop projection 36 is formed upon the adjacent face of the wall of the casing 1, against which the body of the rocker fits when in normal position and which acts as a mechanical equivalent of the stop or bearing face 35 of Fig. 9 in preventing movement of the rocker and partition from normal position in the direction of the triple-valve device. It will be seen that under this construction the rocker 24 has in its movements only one bearing on the casing and that, by reason of the link connection of the rocker to the stem of the release-valve, this bearing is located on the side of the central plane of the partition 7 farthest from the triple-valve device. It will also be obvious that the tubular connections 2 and 3 of the constructions of Figs. 9 and 10 are to be interposed between and connected with adjacent sections of the branch pipe 6.

Inasmuch as the appliance is wholly independent, structurally, of a triple-valve device, it may be applied as a quick-action mechanism, in connection with any suitable triple valve, without modification of or interference with the ordinary and normal functions of the latter, and not being dependent for operation upon that of the triple valve it will perform a useful, although not its complete and designed, function if the triple valve should fail to operate.

I claim as my invention and desire to secure by Letters Patent—

1. In an automatic fluid-pressure brake apparatus, the combination, substantially as set forth, of a train-pipe release-valve, a movable member fitted in the line of traverse of fluid-pressure between a train-pipe and a triple-valve device, a continuously open passage, of limited transverse area relatively to the train-pipe, past or through said movable member, and mechanism interposed between the movable member and the release-valve, for imparting opening movement to the latter in and by the movement of the former.

2. In an automatic fluid-pressure brake apparatus, the combination, substantially as set forth, of a train-pipe release-valve, a movable member fitted in the line of traverse of fluid-pressure between a train-pipe and a triple-valve device, a continuously open passage, of limited transverse area relatively to the train-pipe, past or through said movable member, a bearing upon which said movable member is fitted to traverse, in and by the action of a rapid and material reduction of train-pipe pressure, and mechanism interposed between the movable member and the release-valve, for imparting opening movement to the latter in and by the movement of the former.

3. In an automatic fluid-pressure brake apparatus, the combination, substantially as set forth, of a train-pipe release-valve, a casing having connections leading to the train-pipe and to a triple-valve device, respectively, a partition fitted between the connections of said casing, and movable therein by variation of train-pipe pressure, a continuously open passage, of limited transverse area relatively to the train-pipe, past or through said partition, and mechanism, actuated by said partition, for effecting opening movement of the release-valve.

4. In an automatic fluid-pressure brake apparatus, the combination, substantially as set forth, of a train-pipe release-valve, a movable member fitted in the line of traverse of fluid-pressure between a train-pipe and a triple-valve device, a continuously open passage, of limited transverse area relatively to the train-pipe, past or through said movable member, a bearing upon which said movable member is fitted to traverse in and by the action of a rapid and material reduction of train-pipe pressure, a stop which prevents movement, in one direction, of said movable member from normal position, and mechanism interposed between the movable member and the release-valve, for imparting opening movement to the latter in and by the movement of the former.

5. In an automatic fluid-pressure brake apparatus, the combination, substantially as set forth, of a casing having connections leading to the train-pipe and to a triple-valve device, respectively, a movable member fitted in said casing between the connections thereof, a continuously open passage, of limited transverse area relatively to the train-pipe, past or through said movable member, a train-pipe release-valve controlling communication between the casing and a discharge-passage, mechanism interposed between the movable member and the release-valve, for imparting opening movement to the latter in and by the movement of the former, and a check-valve controlling communication between the train-pipe release-valve and the discharge-passage.

6. In an automatic fluid-pressure brake apparatus, the combination, substantially as set forth, of a casing having connections leading to the train-pipe and to a triple-valve device, respectively, a movable member fitted in said casing, between the connections thereof, a continuously open passage, of limited transverse area relatively to the train-pipe, past or through said movable member, a train-pipe release-valve controlling communication between the casing and a discharge-passage, a piston normally subject to equal degrees of pressure on its opposite sides, and connected to said release-valve, a valve controlling a port through which variation of the relative degree of pressure on the opposite sides of said piston may be effected, and means for actuating said valve in and by the movement of said movable member.

In testimony whereof I have hereunto set my hand.

GEO. WESTINGHOUSE, JR.

Witnesses:
E. W. NEWELL,
J. SNOWDEN BELL.